(No Model.) 2 Sheets—Sheet 1.
W. S. HAMM.
STOP MOTION.
No. 564,015. Patented July 14, 1896.
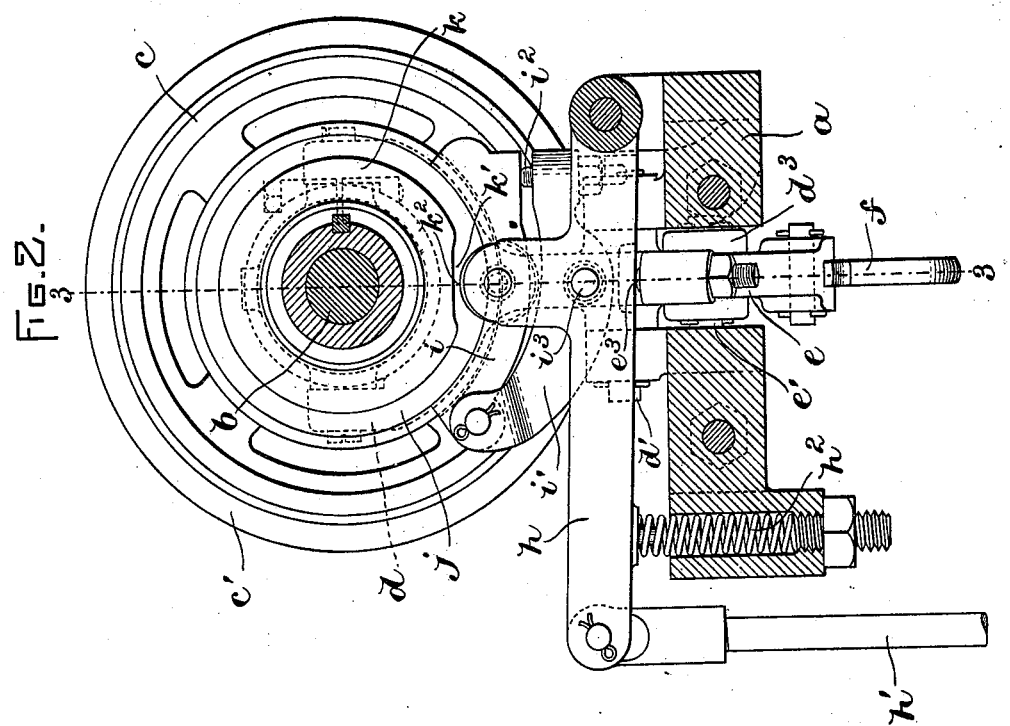
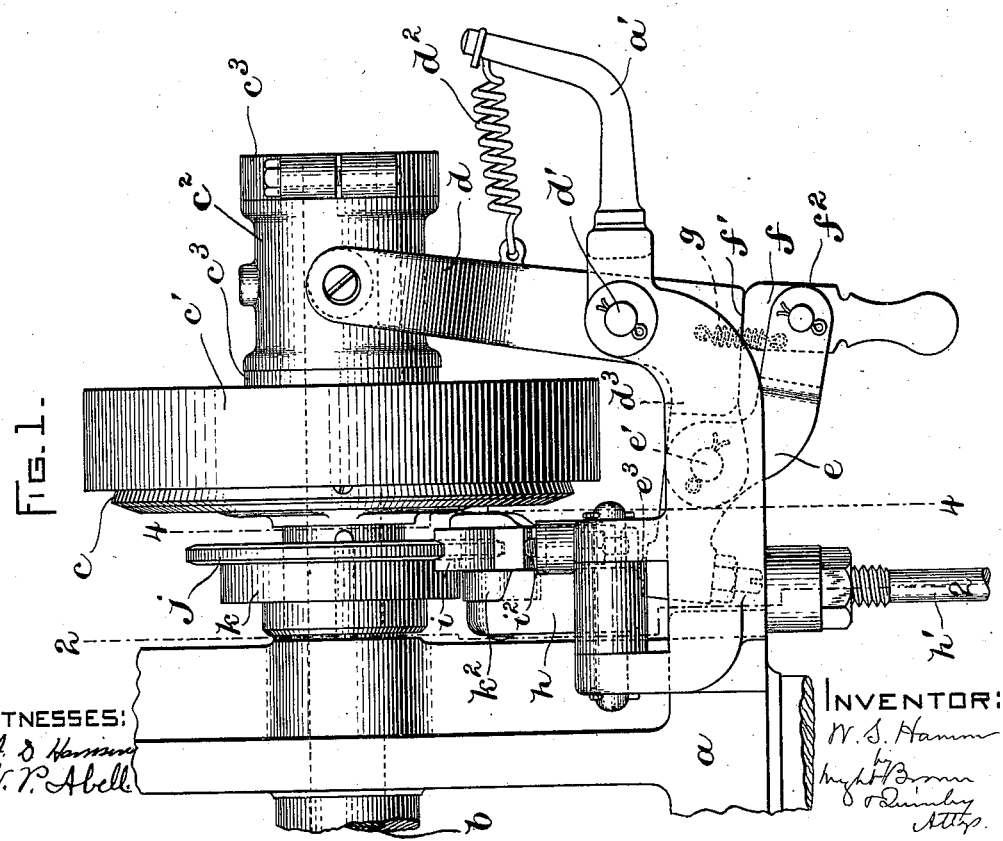
Witnesses:
A. D. Harmon
N. P. Abell
Inventor:
W. S. Hamm
by Wright Brown & Quinby
Attys.

(No Model.) 2 Sheets—Sheet 2.
W. S. HAMM.
STOP MOTION.
No. 564,015. Patented July 14, 1896.
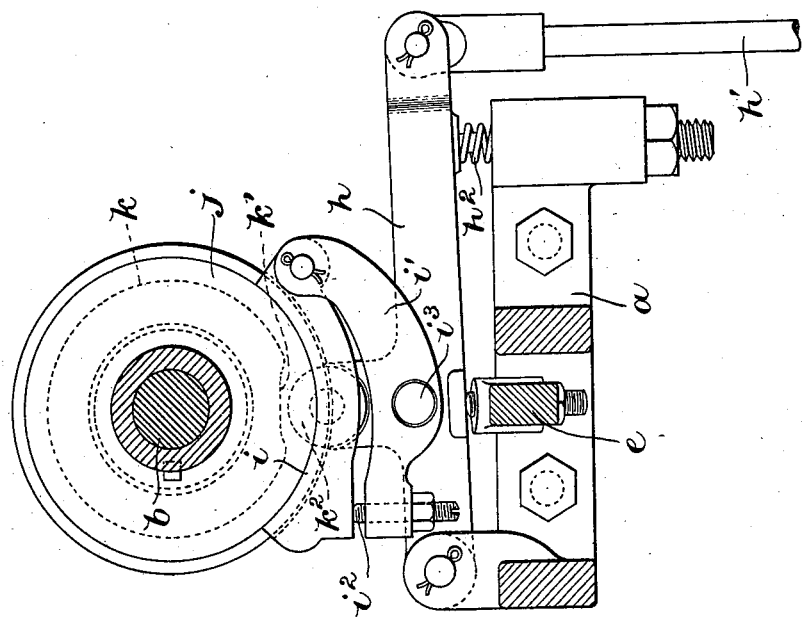
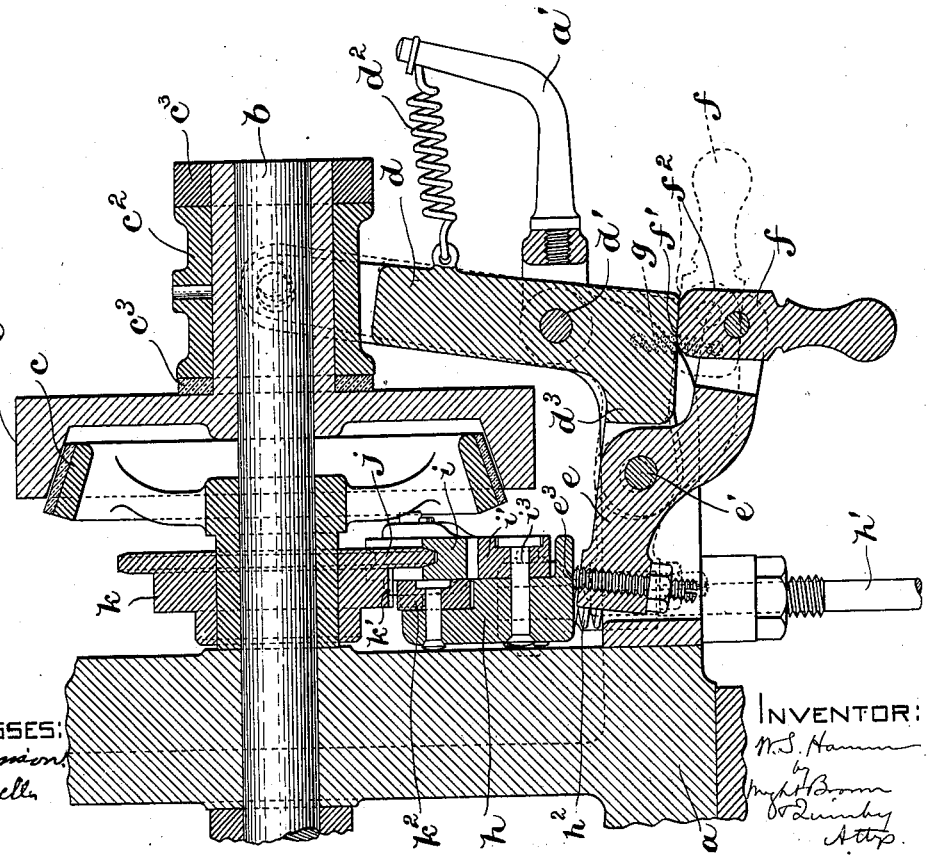
Witnesses:
A. D. Harrison
W. P. Abell
Inventor:
W. S. Hamm
by
[signatures]
Atty.

UNITED STATES PATENT OFFICE.

WILLIAM S. HAMM, OF NEWTON, MASSACHUSETTS, ASSIGNOR TO THE SEAVER PROCESS LASTING COMPANY, OF BOSTON, MASSACHUSETTS.

STOP-MOTION.

SPECIFICATION forming part of Letters Patent No. 564,015, dated July 14, 1896.

Application filed September 14, 1895. Serial No. 562,531. (No model.)

*To all whom it may concern:*

Be it known that I, WILLIAM S. HAMM, of Newton, in the county of Middlesex and State of Massachusetts, have invented certain new and useful Improvements in Stop-Motions, of which the following is a specification.

This invention relates to stop-motions for machines in which the operation is to be automatically stopped at the end of each cycle of movement, with the parts in a certain relation. It is customary in arrangements of this kind to have the depression of a treadle operate a clutch or other means to connect the machine with its motor, and then suitable restraining means come into play to hold the clutch until the machine completes a cycle of movement, when the restraining means become inoperative. A brake is employed in conjunction with the clutch and restraining means to prevent momentum from carrying the parts beyond the initial position. Now it frequently happens—as, for example, in a shoe-sewing machine—that it becomes necessary to move the mechanism of the machine by hand in order to determine proper relative movement of parts, or for other purposes; and the automatic stop-motion would hinder such manipulation. It is therefore the object of my invention to provide means for temporarily disconnecting the treadle and clutch, so that by depressing the treadle the brake may be released without closing the clutch, and then the machine can be freely turned by hand.

To the above end, the invention consists in certain novel constructions and combinations of parts which are recited in the appended claims.

The drawings which accompany and form part of this specification illustrate an embodiment of the invention.

Figure 1 shows the stop-motion in side elevation with the clutch open and the brake applied. Fig. 2 shows a section on line 2 2, Fig. 1. Fig. 3 shows a section on line 3 3, Fig. 2. Fig. 4 shows a section on line 4 4, Fig. 1.

The letter $a$ designates the frame of a machine to which the stop-motion is applied, and $b$ the driving-shaft of that machine. A clutch-cone $c$ is affixed on said shaft, and a clutch-pulley $c'$ runs loose on the shaft and is longitudinally movable thereon to engage it with and disengage it from the clutch-cone. Said pulley will be driven from any suitable source of power. It is formed with an elongated hub on which fits loosely a sleeve $c^2$, confined between collars $c^3$ and engaged by a shipper-fork $d$, pivoted at $d'$ to ears on the frame of the machine and impelled outwardly by a spiral spring $d^2$, attached at one end to said fork and at the other to a horn $a'$, fastened to the frame. It will be seen that this spring exerts itself to hold the clutch open. The shipper-fork $d$ is angular, having a laterally-extending arm $d^3$ below its pivot, and bifurcated to embrace the central portion of a lever $e$, a pivot-pin $e'$ passing through the lever and the bifurcation. On one side of said pivot the lever bends down and under the shipper-fork, where it is bifurcated to accommodate a cam-lever $f$, which has an end face $f'$ to bear against the under surface of the shipper-fork, as shown in full lines in Fig. 3, and a side face $f^2$ to bear against the same surface of the fork under a different adjustment of the lever indicated in dotted lines in Fig. 3. It will be observed that the end surface $f'$ is somewhat farther from the pivot of the lever $f$ than is the side surface $f^2$, and therefore when the said lever $f$ is in the position shown in full lines the inner end of the lever $e$ occupies a higher position than when the lever $f$ is in the dotted-line adjustment. A spiral spring $g$ connects the lever $f$ with the lower end of the shipper-fork, and maintains said lever in its different positions until purposely displaced. The inner end of the lever $e$ carries a bearing-screw $e^3$, and a lever $h$, pivoted at one end to the frame of the machine, bears in its middle portion upon said screw and is connected at its outer end with a rod $h'$, which extends down to a treadle. (Not shown.) A spring $h^2$ upholds the lever $h$. It will now be seen that downward movement of the rod $h'$ (caused by depression of the treadle) will effect the closing of the clutch, such motion being transmitted through levers $h$, $e$, and $f$ and fork $d$ to the clutch-pulley, to move the same toward the clutch-cone.

The lever $h$ not only serves as part of the connections between the treadle and the clutch, but it also supports a brake-shoe $i$, which is pivoted at one end to one end of a rocker $i'$ and bears at the other end against a screw $i^2$ in the other end of said rocker. The latter is connected by a pivot-pin $i^3$ with the lever $h$. The shoe $i$ embraces the marginal portion of a disk $j$ affixed to the hub of the clutch-cone $c$, and it will be seen that by the manner of mounting the shoe it can be caused to maintain a uniform bearing against the disk. The spring $h'$ presses the brake-shoe against the disk, and hence the brake acts at all times except when the treadle is depressed.

There is formed on one side of the brake-disk $j$ an annular shoulder $k$, having a depression $k'$ at one point, and the lever $h$ has an upstanding ear supporting a roller $k^2$, designed to run on the annular shoulder except when opposite the depression.

In the normal condition of the machine the roller $k^2$ is opposite the depression, the brake is applied, and the clutch open. Upon depressing the treadle the clutch is closed through the connections before described, and simultaneously the brake is released. As soon as the depression $k'$ passes the roller $k^2$ the shoulder $k$ comes to bear on the roller and keeps the lever $h$ depressed, so that the machine will continue to operate, even though the treadle be released. When the machine has completed one cycle of movement, however, the depression $k'$ again arrives opposite the roller, and the spring $h^2$ elevates the lever $h$, permitting the spring $g$ to open the clutch and at the same time applying the brake.

It will be understood that during the operations above described the end face $f'$ of the lever $f$ has been against the under surface of the shipper-fork.

Now, if it is desired to move the machine by hand, the lever $f$ is turned to throw its side face $f^2$ against the shipper-fork, and the inner end of the lever $e$ is consequently lowered, and movement of the lever $h$ can take place without affecting the clutch. Under this adjustment, depression of the treadle simply releases the brake, and the machine remains unconnected with its motor and free to be worked by hand.

It is evident that the embodiment of the invention here shown is susceptible of modifications within the scope of the invention.

What I claim as my invention is as follows:

1. The combination of a brake and means for applying and releasing the same, a clutch, a clutch-shipper, and connections between said shipper and the brake-operating means adjustable to make the shipper operative or inoperative with the said means, substantially as described.

2. The combination of a brake, brake-operating means, means for holding the brake mechanism released during a cycle of the machine's operation, a clutch, a clutch-shipper, and connections between said shipper and the brake-operating means adjustable to make the shipper operative or inoperative with the brake, substantially as described.

3. The combination of a clutch, a clutch-shipper, a lever on the latter and carrying a cam-lever having bearing-faces at different distances from its pivot and adapted to press against a surface of the shipper under different adjustments of the cam-lever, a brake, and brake-operating means including a lever coacting with a lever on the shipper, substantially as described.

4. The combination of a brake-disk and annular recessed shoulder, a lever carrying a brake-shoe to engage said disk and a roller to engage the shoulder, means yieldingly pressing the lever toward the brake-disk, and clutch mechanism arranged in conjunction with the said lever, substantially as described.

In testimony whereof I have signed my name to this specification, in the presence of two subscribing witnesses, this 3d day of September, A. D. 1895.

WILLIAM S. HAMM.

Witnesses:
 A. D. HARRISON,
 W. P. ABELL.